Patented June 9, 1931

1,808,929

UNITED STATES PATENT OFFICE

HERBERT HART MAYER AND ROSS GEORGE LA MOTTE, OF HELENA, MONTANA

SULPHURIC ACID FUMING AND DECOMPOSITION PROCESS FOR THE RECOVERY OF ZINC

No Drawing.   Application filed September 29, 1926.   Serial No. 138,566.

This invention relates to a process for the recovery of zinc, and more particularly to a sulphuric acid fuming and decomposition process for that purpose.

To that end the invention contemplates the utilization of carbonate, silicate and sulphide ores of zinc, as found in nature, either in the free state or in combination with other metals, such as copper, lead, silver and gold; and also to the utilization of concentrates, slimes, middlings and tailings resulting from the milling of these ores, either treated separately or in combination with slags, such as those produced in the smelting of complex lead ores. Furthermore, the invention contemplates the utilization of residues as produced in the operation of zinc hydro-metallurgical plants, such residues to be treated in this process in a mixed and combined form with slag, and primarily has in view a practical and economical process for that purpose.

In order to render the process particularly valuable for the recovery of zinc in carbonates, silicates and sulphide zinc ores, either free or in combination with slag, or concentrates, slimes, middlings and tailings, either free or in combination with slag, or zinc residues in combination with slag, one of the distinctive objects thereof is to provide for converting part or all of the original zinc compounds into soluble salts of zinc and recovering these salts in a form adaptable to standard methods for extracting metallic zinc from solutions carrying zinc salts. Furthermore, it is the purpose of the invention to provide means for transforming the other metals contained in the ores, ore products and slags into other soluble salts and to decompose these salts rendering them practically insoluble so that they may be held back, to the desired degree, in the residue during the leaching and filtering periods of the process, thereby permitting the zinc to be brought down into a form that can be handled by standard methods of recovering zinc.

Another important object of the invention is to provide means for recovering part of the sulphuric acid, employed in the process, either as a marketable acid or in such form that it can be returned into the process cycle, and reused in carrying on continued operation. The original acid used may be of commercial grade, or in the pure state, or contained in spent acid from electrolysis of zinc sulphate solution.

Another desirable factor in carrying out the invention is that the amount of iron sulphate entering solution with the zinc can be controlled so that it does not interfere with the recovery of pure zinc by standard methods and so that it will decrease the cost of recovery of zinc by replacing the use of scrap iron as used in the cycle for purification.

In the practice of the invention three principal operations are involved, namely:—

(1) The crushed, ground or granulated ores, ore products and slags are first fumed with sulphuric acid to form sulphates of the metals, and (2) The sulphated charge is heated so as to dehydrate the silica, and (3) The sulphated product is further heated to decompose part or all of the sulphates of the metals into oxides thereof.

The ore or other zinc-bearing material to be treated is first prepared for the fuming operation by grinding or crushing to such fineness as is found most economical for the subsequent treatment operations. Crushing or grinding, or both, may be conducted in either a wet or dry way, and in any appropriate types of apparatus. The fineness to which the material is crushed or ground will be governed largely by its physical character and its amenability to the sulphating treatment.

The thus prepared material is now subjected to the action of sulphuric acid, in any appropriate form, thereby producing a pulp-like mass. The strength of the sulphuric acid employed depends to some extent upon the tendency of the material being treated to gelatinize and may vary through a considerable range in the treatment of different zinc-bearing materials. The time required for the subsequent fuming operation will also be a governing factor in determining the strength of the sulphuric acid to be employed. The sulphuric acid need not be pure, since such impurities as are usually present in crude sulphuric acid are eliminated in the subsequent treatment operations, so that the regenerated or recovered sulphuric acid is of relatively high purity. The amount of sulphuric acid required is governed by the theoretical quantity necessary to form sulphates of all the metals present in the slag and ores and an excess depending upon the speed with which the sulphating is to be carried on.

After the zinc-bearing material has been mixed with the sulphuric acid the resulting mixture is subjected to heat and the fuming operation started. The fuming may be conducted in the same furnace in which the subsequent decomposition roasting or heat treatment is carried out. The time of fuming may vary with the different materials treated and is governed largely by the time required to dehydrate the silica and to drive off any free or unspent acid present. It is important to carry the fuming treatment long enough to convert all, or practically all, of the zinc present into the form of zinc sulphate. In this fuming operation all of the metals soluble in sulphuric acid are converted into their respective sulphates, and in particular the iron and aluminum present are converted into their sulphates. Furthermore, any silica which has been converted into soluble silicic acid during the early stages of this acid treatment is in the later stages, or fuming period, decomposed and the silica rendered insoluble.

Following the fuming operation, the sulphated material is subjected to a heat treatment in the nature of a decomposition roasting in the course of which the iron and aluminum sulphates are completely, or nearly completely, decomposed into their trioxides which are relatively insoluble in dilute solutions of sulphuric acid. This decomposition of the iron and aluminum sulphates may be effected with slight decomposition of the zinc sulphate. A further advantageous result of the decomposition roasting is that during the change of the iron sulphate to the oxide, insoluble iron compounds of arsenic, antimony, tellurium, and selenium are formed, thereby giving purer zinc solutions upon subsequent leaching.

As hereinbefore indicated, any suitable type of apparatus may be employed for carrying out the decomposition roasting. In any case, the operation is carried on at a temperature sufficient to break down the iron and aluminum sulphates into their oxides, in which form these metal compounds are insoluble in water or dilute sulphuric acid. On the other hand, the zinc content of the material remains in a form readily soluble in water or dilute sulphuric acid.

The sulphuric anhydride fumes driven off during the fuming period, together with the sulphuric anhydride fumes, sulphuric acid gas ($SO_3$) which may be expelled during the fuming and decomposition periods, are intended to be conveyed in the conventional manner to the usual condensation apparatus, and the sulphuric solution thus formed either can be evaporated down to chemically pure acid for market purposes or concentrated to the required strength to be returned to the process cycle either for fuming or leaching of subsequent charges.

After obtaining the decomposed product in the manner described it is leached so as to extract therefrom the soluble salts of zinc. In most cases the leaching can be performed with water or comparatively dilute solutions of sulphuric acid and water, ranging from 0.5% to 20% in strength. The leaching solution may of course be varied in strength to suit the conditions of the decomposed product and may be applied in a suitable manner and continued for any suitable length of time according to the conditions and problems confronting the operator.

The residue resulting from the leaching operation is subjected to a filtering step to recover a substantial amount of the leaching solution held in suspension and which solution will be conveyed back to the storage container therefor for reuse. The final solution, coming from the leaching and filtering steps can either be marketed to a zinc reduction works, or the metallic zinc can be extracted on the ground by standard and conventional methods, the product either shipped as a solution or evaporated down to concentrated zinc sulphate.

The residue from the filtering operation either can be used by the smelter as an iron flux practically free from zinc or discarded as a waste product.

The foregoing steps which have been particularized are essential to the practical and economical performance of the process, because without them the impurities, especially iron and silica, would remain in the soluble form and would interfere with the recovery of zinc. Furthermore, it will be observed that this process develops practically no waste material, therefore being economical in operation, while at the same time providing a thoroughly practical way of recovering the zinc content from carbonate, silicate and sulphide ores, concentrates, slimes, middlings and tailings made from such ores, from residues resulting from zinc plant operations, and from slags as produced in the smelting of complex lead ores.

We claim:—

1. The process for treating zinc-bearing material which comprises mixing the material with a quantity of sulphuric acid in excess of that required to convert zinc and other metals contained therein to the sulfate form, subjecting the resulting mixture to a fuming operation to effect the desired conversion of metals to the sulfate form, roasting the resulting product to convert at least a portion of the zinc sulfate to zinc oxide, and recovering zinc from the roasted product by leaching with a sulfuric acid solution.

2. The process for treating zinc-bearing residues obtained from hydro-metallurgical and like operations which comprises mixing the residue with a quantity of sulphuric acid in excess of that required to convert zinc and other metals contained therein to the sulphate form, subjecting the resulting mixture to a fuming operation to effect the desired conversion of metals to the sulphate form, roasting the resulting product to convert at least a portion of the zinc sulphate to zinc oxide, and recovering zinc from the roasted product by leaching with a sulphuric acid solution.

3. The process for recovering zinc which comprises mixing zinc-bearing residue and zinc-bearing slag with a quantity of sulphuric acid in excess of that required to convert zinc and other metals contained therein to the sulphate form, subjecting the resulting mixture to a fuming operation to effect the desired conversion of metals to the sulphate form, roasting the resulting product to convert at least a portion of the zinc sulphate to zinc oxide, and recovering zinc from the roasted product by leaching with a sulphuric acid solution.

In testimony whereof we hereunto affix our signatures.

HERBERT HART MAYER.
ROSS GEORGE LA MOTTE.